(12) United States Patent
Moore (10) Patent No.: US 12,043,376 B2
(45) Date of Patent: Jul. 23, 2024

(54) WING TILT ACTUATION SYSTEM FOR ELECTRIC VERTICAL TAKE-OFF AND LANDING (VTOL) AIRCRAFT

(71) Applicant: AMSL Innovations Pty Ltd, Stanmore (AU)

(72) Inventor: Andrew Dudley Moore, Stanmore (AU)

(73) Assignee: AMSL INNOVATION PTY LTD, Stanmore (AU)

( * ) Notice: Subject to any disclaimer, the term of this patent is extended or adjusted under 35 U.S.C. 154(b) by 25 days.

(21) Appl. No.: 16/647,817

(22) PCT Filed: Sep. 6, 2018

(86) PCT No.: PCT/AU2018/050963
§ 371 (c)(1),
(2) Date: Mar. 16, 2020

(87) PCT Pub. No.: WO2019/056053
PCT Pub. Date: Mar. 28, 2019

(65) Prior Publication Data
US 2020/0223542 A1    Jul. 16, 2020

(30) Foreign Application Priority Data

Sep. 22, 2017 (AU) ............................... 2017903864
Oct. 6, 2017 (AU) ............................... 2017904036
Apr. 6, 2018 (AU) ............................... 2018901154

(51) Int. Cl.
*B64C 29/00* (2006.01)
*B60L 15/20* (2006.01)
(Continued)

(52) U.S. Cl.
CPC .......... *B64C 29/0033* (2013.01); *B60L 15/20* (2013.01); *B64C 3/38* (2013.01);
(Continued)

(58) Field of Classification Search
CPC ....... B64C 29/0033; B64C 3/38; B64C 27/52; B64C 27/82; B64C 39/068; B64C 39/08;
(Continued)

(56) References Cited

U.S. PATENT DOCUMENTS 1,498,412 A    6/1924  Whiteside
3,181,810 A    5/1965  Olson
(Continued)

FOREIGN PATENT DOCUMENTS

CN    1202861 A    12/1998
CN    105882961    8/2016
(Continued)

OTHER PUBLICATIONS

International Search Report for PCT/AU2018/050963, dated Oct. 11, 2018.
(Continued)

*Primary Examiner* — Philip J Bonzell
*Assistant Examiner* — Cindi M Curry
(74) *Attorney, Agent, or Firm* — NIXON PEABODY LLP; Jeffrey L. Costellia (57) ABSTRACT

A vertical take-off and landing (VTOL) aircraft (10) comprises a fuselage (24) first and second forward wings (20, 22) and first and second rearward wings (30, 32), each wing having a fixed leading edge (25, 35) and a trailing control surface (50) which is pivotal about a generally horizontal axis. Electric rotors (60) are mounted to the wings (20, 22, 30, 32), the electric rotors (60) being pivotal with the trailing control surface (50) between a first position in which each rotor (60) has a generally vertical axis of rotation, and a second position in which each rotor (60) has a generally horizontal axis of rotation; wherein at least one of the wings (20, 22, 30, 32) has a first and a second electric rotor (60) which are each mounted having non-parallel axes of rotation
(Continued)

so that the thrust lines of the first and second electric rotors are different.

20 Claims, 12 Drawing Sheets

(51) Int. Cl.
  *B64C 3/38* (2006.01)
  *B64C 9/00* (2006.01)
  *B64C 9/16* (2006.01)
  *B64C 13/00* (2006.01)
  *B64C 27/52* (2006.01)
  *B64C 27/80* (2006.01)
  *B64C 27/82* (2006.01)
  *B64C 39/06* (2006.01)
  *B64D 27/24* (2006.01)
(52) U.S. Cl.
  CPC ............... *B64C 9/00* (2013.01); *B64C 9/16* (2013.01); *B64C 13/00* (2013.01); *B64C 27/52* (2013.01); *B64C 27/80* (2013.01); *B64C 27/82* (2013.01); *B64C 39/068* (2013.01); *B64D 27/24* (2013.01); *B60L 2200/10* (2013.01); *B64C 2027/8227* (2013.01)
(58) Field of Classification Search
  CPC ......... B64C 2027/8227; B64C 23/069; B64C 29/0075; B64C 29/0083; B64C 29/0066; B64C 29/0091; B64D 27/24
  See application file for complete search history.

(56) References Cited

U.S. PATENT DOCUMENTS

| | | | |
|---|---|---|---|
| 5,046,684 A | 9/1991 | Wolkovitch | |
| 5,417,386 A * | 5/1995 | Wernicke | B60F 5/02 244/2 |
| 10,183,746 B2 * | 1/2019 | McCullough | B64C 29/0033 |
| 10,807,707 B1 * | 10/2020 | Ter Keurs | B64C 25/52 |
| 10,974,827 B2 * | 4/2021 | Bevirt | B64C 11/46 |
| 2005/0178879 A1 | 8/2005 | Mao | |
| 2006/0144991 A1 | 7/2006 | Frediani | |
| 2009/0256026 A1 * | 10/2009 | Karem | B64C 27/08 244/99.2 |
| 2011/0042509 A1 * | 2/2011 | Bevirt | B64C 29/0033 244/12.4 |
| 2012/0261523 A1 | 10/2012 | Shaw | |
| 2015/0266571 A1 | 9/2015 | Bevirt et al. | |
| 2016/0200436 A1 | 7/2016 | North et al. | |
| 2016/0288903 A1 * | 10/2016 | Rothhaar | B64C 29/0033 |
| 2016/0311522 A1 | 10/2016 | Wiegand | |
| 2016/0347447 A1 | 12/2016 | Judas et al. | |
| 2017/0174335 A1 | 6/2017 | Malloy | |
| 2017/0297699 A1 | 10/2017 | Alber et al. | |
| 2019/0291862 A1 * | 9/2019 | Lyasoff | B64C 15/12 |

FOREIGN PATENT DOCUMENTS

| | | | |
|---|---|---|---|
| CN | 106573677 | 4/2017 | |
| CN | 106573678 | 4/2017 | |
| JP | S39-002026 | 2/1964 | |
| WO | WO-2015143098 A2 * | 9/2015 | ............ B64C 11/10 |
| WO | 2016135697 A1 | 1/2016 | |
| WO | 2017096478 A1 | 6/2017 | |
| WO | WO-2017-200610 | 11/2017 | |
| WO | WO-2017200610 A1 * | 11/2017 | ............ B64C 3/385 |

OTHER PUBLICATIONS

Response to Written Opinion for PCT/AU2018/050963.
Preliminary Report on Patentability for PCT/AU2018/050963, dated Apr. 18, 2019.

* cited by examiner

WING TILT ACTUATION SYSTEM FOR ELECTRIC VERTICAL TAKE-OFF AND LANDING (VTOL) AIRCRAFT

TECHNICAL FIELD

The present disclosure relates to a wing tilt actuation system for electric vertical take-off and landing (VTOL) aircraft. In particular, the present invention relates to a wing tilt actuation system and mechanism for electric VTOL aircraft having passenger and/or military applications.

BACKGROUND OF THE INVENTION

VTOL aircraft are capable of take-off and landing vertically, or at some angle which is close to vertical. This style of aircraft includes helicopters and certain fixed wing aircraft, often used for military applications. Advantageously, VTOL aircraft permit take-off and landing in limited spaces, which negates the need for a large runway, and permits take-off and landing in small spaces and such as boat decks and landing pads on buildings and other structures.

Helicopters are a style of aircraft in which lift and thrust are both provided by rotors. There are several issues associated with helicopters which may be problematic in some applications, such as the high levels of noise output. One such disadvantage associated with helicopters concerns the rotor design which is critical for flight. There is generally no redundancy in the design, meaning that operation of the (or each) rotor is critical. This lack of redundancy dictates that large factors of safety must be applied to all components of the rotor and drive train, which adds considerably to the weight and manufacture cost of helicopters.

Electric aircraft are of increasing interest for various commercial and safety reasons. In recent years there has been a large amount of development with respect to drone technologies, which generally utilise a plurality of electric rotors spaced around a pitch circle diameter. Drones generally operates with the electric rotors each rotating about an axis which is generally vertical.

Whist drones are becoming commercially viable for delivering small payloads, they are generally limited to relatively low flight speeds, on account of the vertical axis of rotation of the rotors. Furthermore, they tend to have reasonably low ranges of travel per battery charge.

Tilt wing aircraft are available and generally operate on the principle of a vertical propeller axis for take-off and landing, and the wings are configured to tilt between a configuration in which the propellers have vertical axes for take-off and landing, and a configuration in which the propellers have horizontal axes for forward flight.

The above noted tilt wing arrangement provides the advantage of take-off and landing in areas with limited available clear space, such as aircraft carriers and landing pads. In addition, tilt wing aircraft are able to provide flight speed comparable with conventional propeller driven fixed wing planes.

Tilt wing aircraft generally have electric motors or gas turbine engines which drive propellers or ducted fans directly mounted to the wing. The entire wing rotates between vertical and horizontal to tilt the thrust vector from vertical to horizontal and return.

By way of definition, the "Thrust line" also referred to as the "thrust vector" is the thrust force of the propeller and is approximately the same as axis of rotation of the propeller. The "hinge line" is the axis of the hinge rotation.

There are several inherent disadvantages with existing tilt wing aircraft. One disadvantage concerns the actuators and bearings or other such mechanisms required to control the angle of inclination of the wing between the take-off/landing configuration and the forward flight configuration. The actuators may also serve to lock the wing at the desired inclination during forward flight. However, in practice, the actuators and bearings add significant weight to the aircraft. This results in a reduction of the amount of payload such as personnel or cargo that can be transported. Furthermore, because of the critical nature of the wing tilt actuation system and bearings, that assembly must be designed with a sufficient degree of redundancy to reduce the risk of catastrophic failure.

An electric VTOL jet is currently being designed and tested by Lilium Aviation, under the brand Lilium Jet™. That prototype is intended as a lightweight commuter aircraft for two passengers having two wings and around 36 electric motors.

A disadvantage of the Lilium Jet™ type aircraft concerns the electric motors which are encased fan type motors. This arrangement is highly energy intensive, resulting in reduced possible flight range for a given battery size.

Furthermore, the encased fans can only be operated for take-off and landing on hardstand surfaces, such as designated landing pads and runways. This limits the usability of the aircraft, and prevents it from being operated during take-off and landing on non-hardstand surfaces, such as parks, fields and gardens. For military applications, this is undesirable, and does not cater for impromptu landings in remote locations.

Another concept VTOL aircraft is the S2 Electric™ by Joby Aviation. This design has fixed wings with a plurality of electric motors, preferably four, mounted to each wing. Four additional motors are mounted to the rear stabiliser or tail. A disadvantage of this concept aircraft is that each electric motor is independently actuated, requiring a separate actuator for each motor. As noted above, this requires significant additional weight for the actuation motor system.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a vertical take-off and landing (VTOL) aircraft comprising:
  a fuselage;
  first and second forward wings mounted to opposing sides of the fuselage;
  first and second rearward wings mounted to opposing sides of the fuselage;
  each wing having a fixed leading edge and a trailing control surface which is pivotal about a generally horizontal axis;
  a plurality of electric rotors mounted to the wings, the electric rotors being pivotal with the trailing control surface between a first position in which each rotor has a generally vertical axis of rotation, and a second position in which each rotor has a generally horizontal axis of rotation;
  wherein at least one of the wings has a first and a second electric rotor which are each mounted having non-parallel axes of rotation so that the thrust lines of the first and second electric rotors are different.

A thrust line of the first electric rotor is preferably angled to pass above a hinge line, and a thrust line of the second electric rotor is angled to pass below the hinge line.

An axis of rotation of the first electric rotor is preferably angled upwardly relative to a plane passing through leading and trailing portions of the control surface, and an axis of rotation of the second electric rotor is angled downwardly relative to a plane passing through leading and trailing portions of the control surface.

When the first and second electric motors are operated at the same rotational speeds, turning moments generated by each of the first and second motors and acting on the control surface preferably cancel each other out.

The first and second electric motors are preferably pivotally mounted to an underside of the fixed leading edge.

A distal end of each of the first and a second electric rotors is preferably secured to the trailing control surface.

In a second aspect, the present invention provides a vertical take-off and landing (VTOL) aircraft comprising:
- a fuselage;
- first and second forward wings mounted to opposing sides of the fuselage;
- first and second rearward wings mounted to opposing sides of the fuselage;
- each wing having a fixed leading edge and a trailing control surface which is pivotal about a generally horizontal axis;
- a plurality of electric rotors mounted to the wings, the electric rotors being pivotal with the trailing control surface between a first position in which each rotor has a generally vertical axis of rotation, and a second position in which each rotor has a generally horizontal axis of rotation;
- wherein at least one of the wings has a first and a second electric rotor which are offset relative to upper and lower surfaces of the wing.

Preferably the first electric rotor is located below the lower surface of the wing, and the second electric rotor is located above the upper surface of the wing.

The electric rotors are preferably distributed along the wing at positions below the lower surface of the wing and alternately above the upper surface of the wing.

A distal portion of each forward wing, furthest from the fuselage, is preferably connected to a distal portion of the adjacent rearward wing with a connecting member, defining a boxed wing structure.

Each forward wing is preferably connected to the adjacent rearward wing with one or more struts or tie bars.

The control surface is preferably pivotal through a range of about 80 and 100 degrees. The control surface is preferably pivotal through a range of about 90 degrees.

In a third aspect, the present invention provides a vertical take-off and landing (VTOL) aircraft comprising:
- a fuselage;
- first and second forward wings mounted to opposing sides of the fuselage;
- first and second rearward wings mounted to opposing sides of the fuselage, each forward wing being connected to the adjacent rearward wing with a distal connecting member or strut(s) to define a box wing or strut braced wing structure;
- each wing having a fixed leading edge and a trailing control surface which is pivotal about a generally horizontal axis;
- a plurality of electric rotors mounted to the wings, the electric rotors being pivotal with the trailing control surface between a first position in which each rotor has a generally vertical axis of rotation, and a second position in which each rotor has a generally horizontal axis of rotation.

At least one of the wings preferably has a first and a second electric rotor which are offset relative to an upper and a lower surface of the wing.

The first electric rotor is preferably located below the lower surface of the wing, and the second electric rotor is preferably located above the upper surface of the wing.

The electric rotors are preferably distributed along the wing at positions below the lower surface of the wing and alternately above the upper surface of the wing.

At least one of the wings preferably has a first and a second electric rotor, wherein a thrust line of the first electric rotor is angled to pass above a hinge line, and a thrust line of the second electric rotor is angled to pass below the hinge line.

The electric rotors are preferably located on an underside of each wing.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

A vertical take-off and landing (VTOL) aircraft 10 is disclosed. In the preferred embodiment, as depicted in the drawings, there are two pairs of wings. Namely, the forward wings 20, 22 and the rearward wings 30, 32, Each of the forward wings 20, 22 is attached to a laterally opposing region of the fuselage 24. Similarly, each of the rearward wings 30, 32 is attached to a laterally opposing region of the fuselage 24. In the embodiment shown in the drawings, the aircraft 10 is depicted as a single seat or double seat aircraft 10. However, larger multi-person embodiments are also envisaged. The aircraft 10 may be controlled from within by a pilot, or alternatively it may be remotely controlled.

In the embodiment shown in the drawings, distal portions of the forward wings 20, 22 and the rearward wings 30, 32 are connected with connecting members or webs 42, such that the two pairs of wings 20, 22, 30, 32 define a boxed wing or closed wing structure.

In another embodiment (not shown), the forward wings 20, 22 and the rearward wings 30, 32 may be strut braced wings, connected with tie bars or struts. A strut braced wing is generally lighter than a conventional cantilevered wing.

Whilst the VTOL aircraft 10 described herein is a boxed wing or strut braced aircraft 10, it will be appreciated by those skilled in the art that the aircraft 10 may be a conventional cantilevered wing aircraft in which the forward wings 20, 22 and the rearward wings 30, 32 are separate and not interconnected. Furthermore, the aircraft 10 may have only a single pair of wings.

Referring to the figures, the forward wings 20, 22 and the rearward wings 30, 32 are vertically separated, such that the forward wings 20, 22 are vertically positioned below the rearward wings 30, 32.

Figure 2:
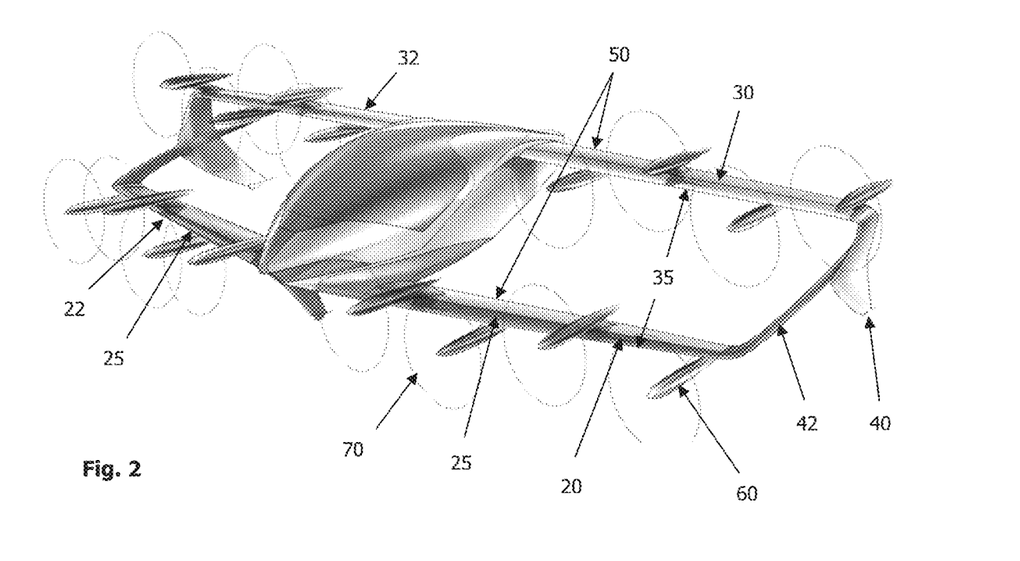
FIG. 2 is a schematic diagram depicting the VTOL aircraft of FIG. 1 in a second, forward flight configuration.
Figure 3:
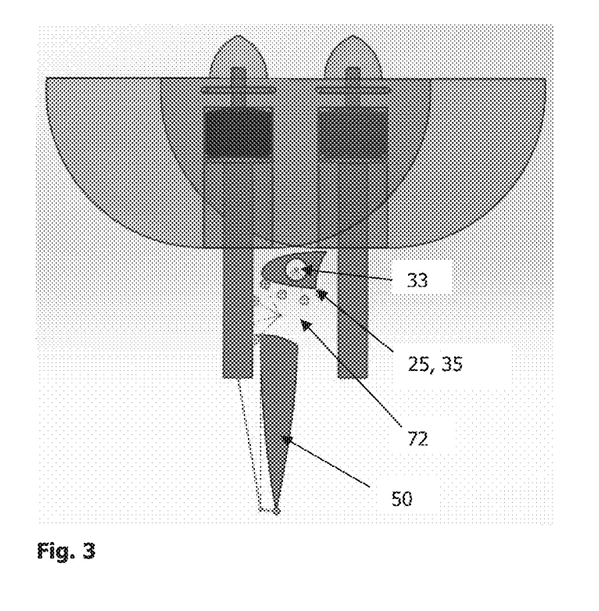
FIG. 3 is a schematic showing a mounting arrangement for mounting an electric motor to a wing of the aircraft of FIGS. 1 and 2 in a vertical (take-off and landing) rotor position.
Figure 4:
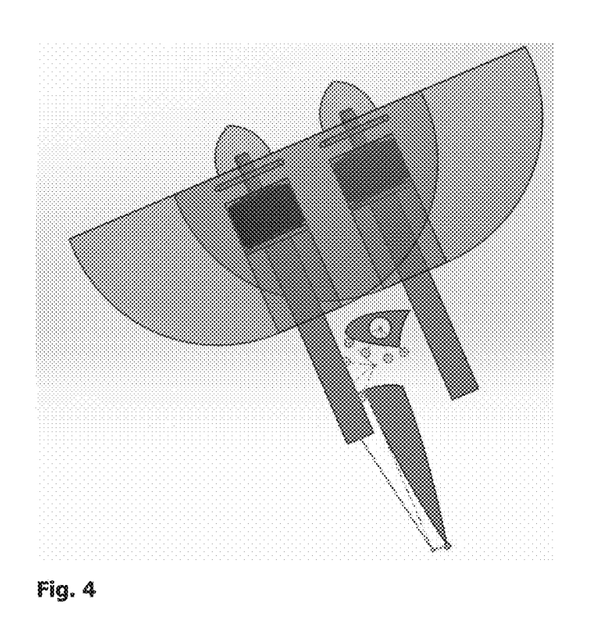
FIG. 4 is a further schematic view of the arrangement of FIG. 3 with the rotor in a partially inclined position.
Figure 5:
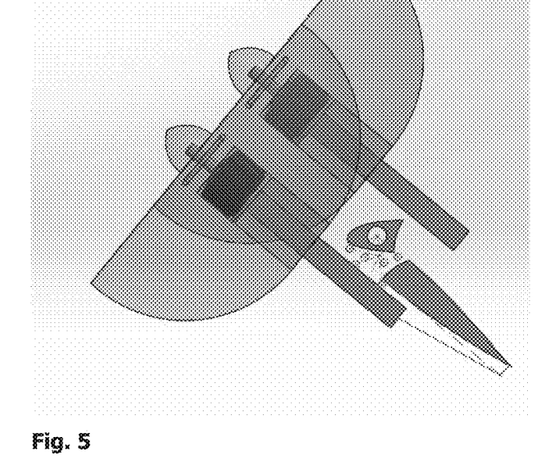
FIG. 5 is a further schematic view of the arrangement of FIG. 3 with the rotor in a further inclined position.
Figure 13:
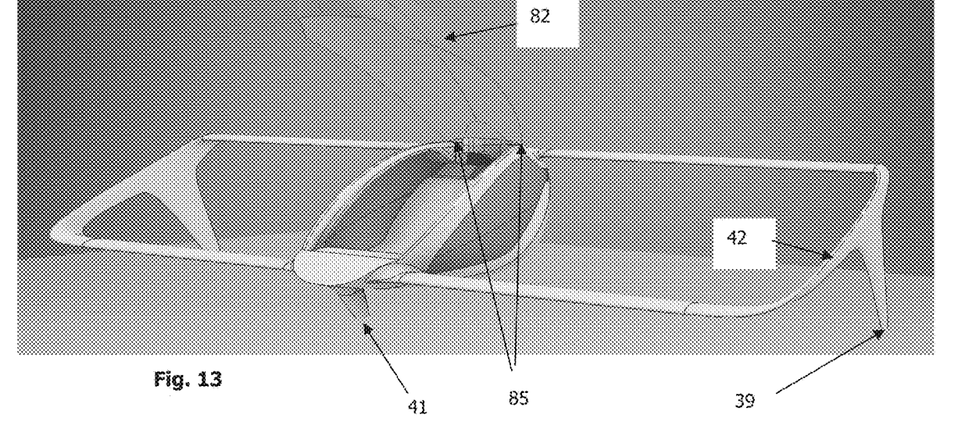
FIG. 13 is a perspective schematic view of the aircraft in a parked configuration with the access hatch open.

As depicted in FIG. 2, the tip portion 40 of the rearward wings 30, 32 extends downwardly and rearwardly. This wing tip portion, or winglet 40, assists to reduce wing tip vortices. The winglets 40 may include one or more wheels 39 (FIGS. 13 and 14) for supporting the aircraft 10 when stationary, and during take-off and landing. The aircraft 10 also has a further wheel or set of wheels 41 which are located beneath the fuselage 24, generally near the front of the fuselage 24. In this way, the rear wheels 39 and front wheels 41 are positioned at the vertices of an isosceles triangle. By locating the rear wheels 39 on the winglets 40, the width of the aforementioned isosceles triangle is maximised, thereby increasing the stability of the aircraft 10.

Figure 14:
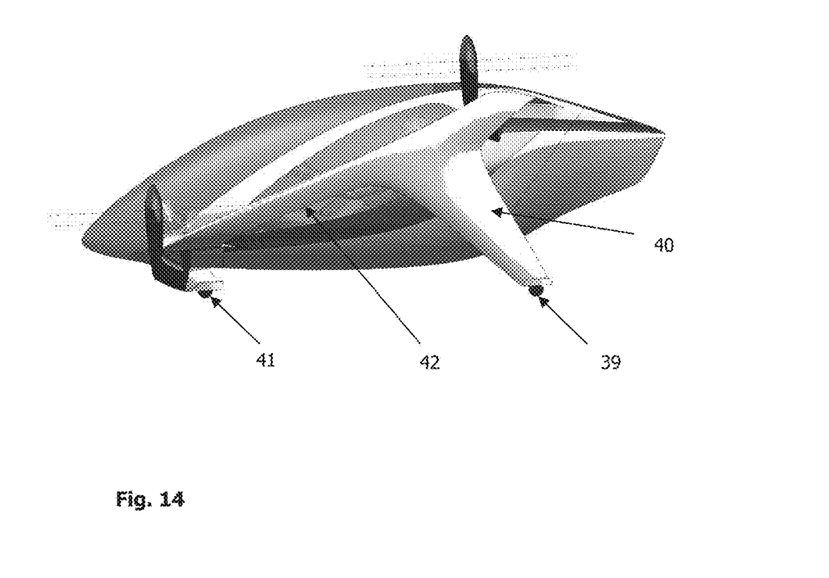
FIG. 14 is a side view of aircraft with the rotors depicted in a vertical axis position.

Referring to the side view of FIG. 14, the winglet 40 and connecting member 42 together define a generally T-shaped portion of the wing assembly.

Referring to the embodiments of FIGS. 13 to 17, the cabin is accessed through a door or hatch 82 which is hinged at the top, above the occupants by way of hinges 85. In the embodiment shown in FIGS. 13 to 18, there are two hinges 85, and the hatch 82 is upwardly opening.

The upper located hinge 85 arrangement for securing the hatch 82 and the upwardly opening hatch 82 provide several functional advantages. Firstly, this configuration permits the users to access the cabin from the front of the aircraft 10, without coming into proximity to the rotors 70. This arrangement makes the egression from the aircraft 10 particularly simple, as the user simply stands from the seated position and moves forward, away from the aircraft 10.

The upwardly opening hatch 82 also provides improved rain protection during entry and egression, as the hatch remains generally above the cabin when open.

Furthermore, the hatch 82 permits the front of the cabin to be located close to the underlying ground surface. The step height from the underlying ground surface to enter the cabin is around 250 mm, which represents a large improvement in comfort and ease of entry/egression compared to other light aircraft.

Again referring to FIG. 2, a proximal side of each winglet 40 is connected to the connecting member 42 which joins the adjacent forward wing 20 and rearward wing 30. A further connecting member 42 joins the adjacent forward wing 22 and rearward wing 32 on the opposing side of the fuselage 24.

Each of the forward wings 20, 22 and the rearward wings 30, 32 has a fixed leading edge 25, 35. The leading edge 25, 35 has a curved profile, in the form of a portion of an aerofoil. Importantly, the leading edge does not rotate or otherwise move relative to the fuselage 24.

On the trailing side of each fixed leading edge 25, 35, the forward wings 20, 22 and/or the rearward wings 30, 32 have a pivotally mounted aileron or control surface 50.

Figure 1:
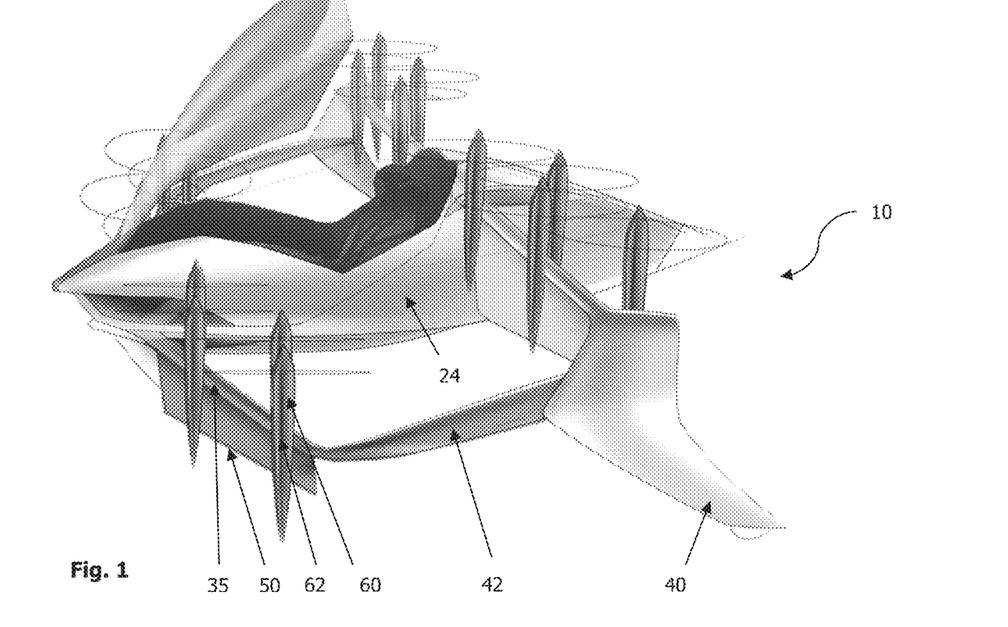
FIG. 1 is a schematic diagram depicting the vertical take-off and landing (VTOL) aircraft of the present invention in a take-off and landing configuration.

Each control surface 50 is pivotal between a generally vertical configuration for take-off and landing (as depicted in FIG. 1) and a generally horizontal configuration for forward flight (as depicted in FIG. 2).

The control surface 50 may be a single surface which extends continuously along the full length of the wing 20, 22, 30, 32. Alternatively, each wing 20, 22, 30, 32 may have one or more independently pivotal control surfaces 50, such that the control surfaces 50 are capable of pivoting about the leading edge 25, 35, independent of the other control surfaces 50.

The vertical take-off and landing (VTOL) aircraft 10 includes a plurality of electric motors 60. Each motor 60 has a propeller or rotor 70. As depicted in the figures, the body portion 62 of each motor 60 is mounted adjacent to the upper surface or the lower surface of the moveable control surface 50, generally in front of the fixed leading edge 25, 35. The control surface 50 is able to rotate though a range of between about 80 and 100 degrees, and preferably approximately 90 degrees for both horizontal flight mode (FIG. 2) and vertical flight mode (FIG. 1).

The motors 60 may be mounted sufficiently forward of the fixed leading edge 25, 35 so that the rotor blades can fold rearwardly and remain clear of the wing structure. However, a preferred embodiment uses non-folding rotors 70 with a variable pitch mechanism. Fixed pitch blades may also be used.

There are two possible mounting arrangements for the motors 60 and control surface 50:
a) Each motors 60 may be pivotally connected to one of the fixed leading edges 25, 35, and the control surface 50 is secured to the body portion 62 of the motor 60; or
b) The control surface 50 may be pivotally connected to one of the fixed leading edges 25, 35, and the control surface is secured to the body portion 62 of the motor 60.

The electric motors 60 are each pivotal about the leading edge 25, 35 with the control surfaces 50 between a first position in which the rotor of each motor 60 has a generally vertical axis of rotation, and a second position in which each the rotor of each motor 60 has a generally horizontal axis of rotation.

In the embodiment depicted in FIGS. 1 to 6, at least one of the wings 20, 22, 30, 32 has a first and a second motor 60 which are offset relative to each other about a plane passing through the control surface 50. In the embodiment shown in FIGS. 1 to 6 of the drawings, this is achieved by locating the motors 60 on opposing upper and lower sides of the wing 20, 22, 30, 32. In the embodiment depicted in FIGS. 1-6, each wing has four electric motors 60. Namely two electric motors 60 mounted above the wing 20, 22, 30, 32 and two electric motors 60 mounted below the wing 20, 22, 30, 32, in an alternating configuration. In another embodiment, each wing 20, 22, 30, 32 has two electric motors 60.

The electric motors 60 and their mounting pylons are each mounted to the pivoting control surface 50. Each motor 60 rotates about a hinge point 33. The four motors 60 are mounted with different thrust lines. In particular, two of the motors 60 have a thrust line that tends to rotate the control surface 50 horizontally, and other two motors have a thrust line that tends to rotate the wing 20, 22, 30, 32 vertically. When all four motors 60 operate in unison the moments cancel out, and stabilisation is achieved in the vertical flight mode.

The sequence of wing adjustment, depicted in FIGS. 3 to 6, shows the change of inclination of the motors 60 and control surface 50 when transitioning between the take-off wing position and the forward flight wing position. As shown in those figures, the leading edges 25, 35 are stationary, and non-pivoting. In contrast, the motors 60 and control surfaces 50 pivot in unison.

Figure 6:
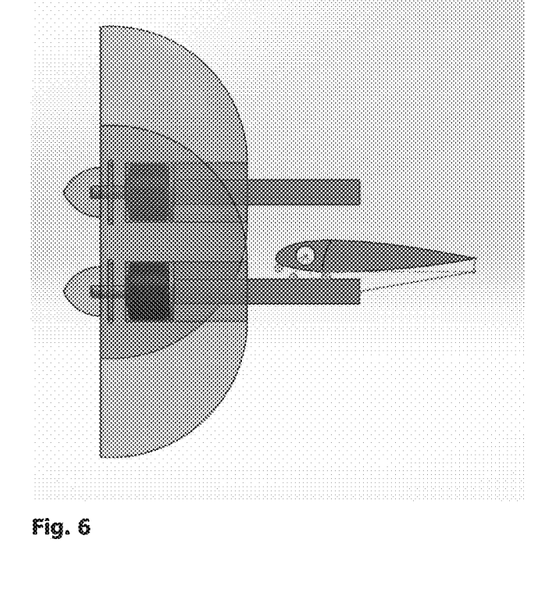
FIG. 6 is a is a further schematic view of the arrangement of FIG. 3 with the rotor in horizontal (forward flight) position.
Figure 7:
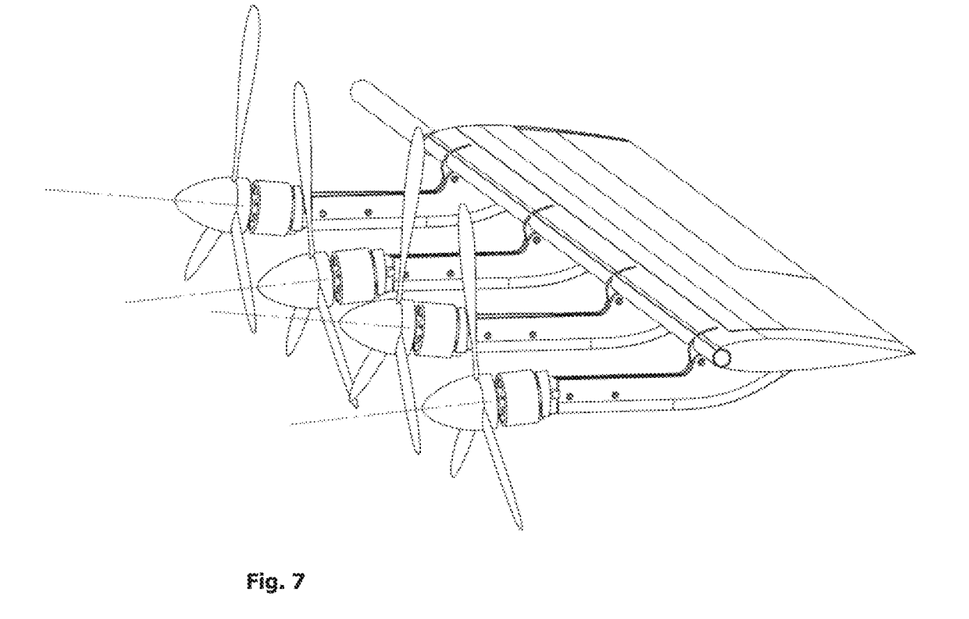
FIG. 7 is a perspective view depicting a further embodiment of the VTOL aircraft.

Referring to FIG. 6, when the wing reaches the final, horizontal position, for forward flight, the engagement between the leading edges 25, 35 and the control surfaces 50 prevents the wing 20, 22, 30, 32 from pivoting further. This occurs because the wing 20, 22, 30, 32 and control surface 50 have complimentary engagement surfaces.

A second embodiment of the invention is shown in FIGS. 7 to 12. In this embodiment, the four motors 60 are each mounted below the wings 20, 22, 30, 32. In particular, each motor 60 is hingedly secured to a location below the wing 20, 22, 30, 32, which can be used to create a leading edge slot 72, that further increases the coefficient of lift and reduces buffet at high angles of tilt, in descent.

The leading edge slot 72 is the gap between the leading edges 25, 35 and the tilting control surface 50. The slot 72 can be seen in FIGS. 3, 4, 5 and is in the closed position in FIG. 6. The leading edge slot 72 can also be seen in FIG. 11A.

Figure 8:
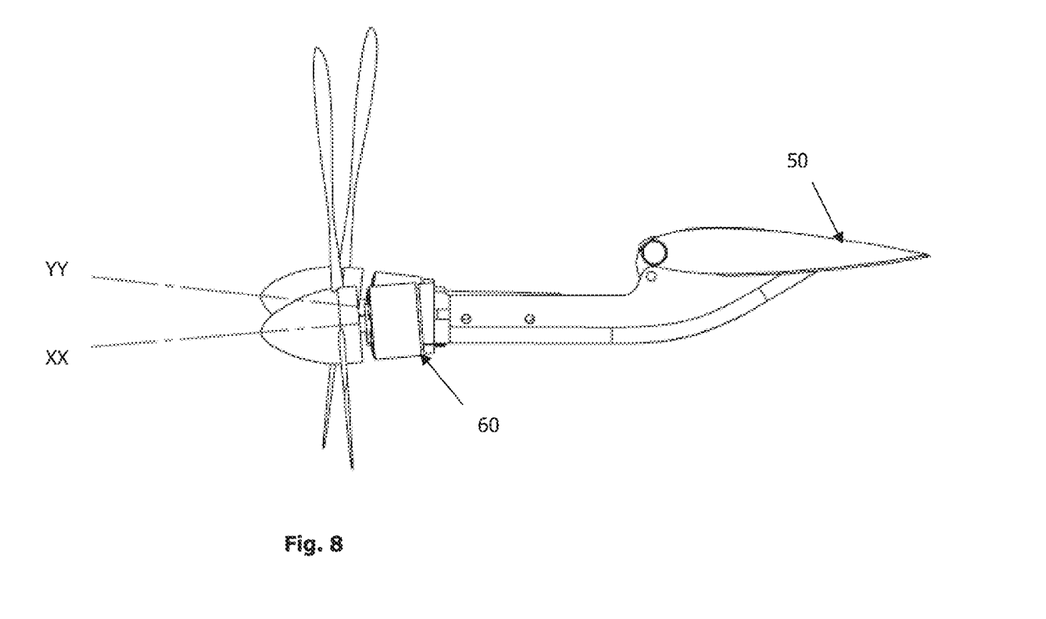
FIG. 8 is a side view of the wing arrangement of FIG. 7.
Figure 9:
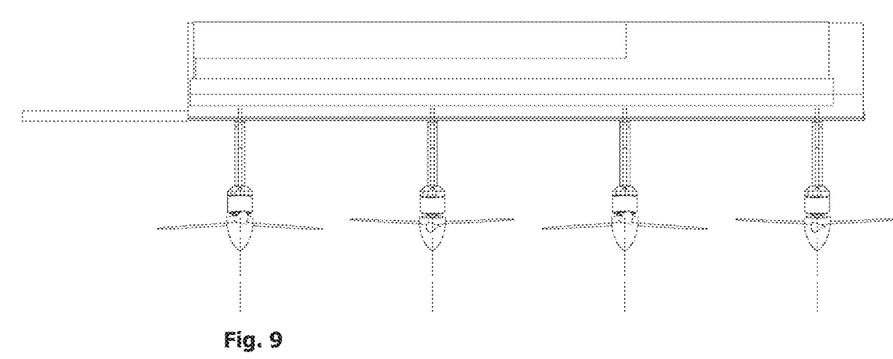
FIG. 9 is a top view of the wing arrangement of FIG. 7.

Referring to FIG. 8, in this arrangement the axes of rotation of the motors 60 are non-parallel. In particular, for each pair of motors 60, each odd motor 60 has an axis of rotation XX which is downwardly inclined relative to the control surface 50, and each even motor 60 has an axis of rotation YY which is upwardly inclined relative to the control surface 50. In this manner, one of the motors 60 has a thrust line that tends to rotate the control surface 50 clockwise, and other motor has a thrust line that tends to rotate the control surface 50 counter-clockwise. When the pair of motors 60 operate in unison, at a similar rotational speed, the moments cancel out, and stabilisation is achieved in the vertical flight mode.

The aircraft 10 provides a separately regulated power supply to each motor 60. This permits a different voltage to be delivered to each motor, and hence variable power output can selectively be generated by each motor 60 to achieve desired flight conditions such as turning left and right.

Furthermore, the independent power of the motors 60 enables the motors 60 to be used to tilt the control surface 50 located on the trailing edges of the wings 20, 22, 30, 32.

FIGS. 11A to 11D show a side schematic of a motor 60 mounted to the underside of one of the wings 20, 22, 30, 32. A hinge plate 28 is connected to the fixed leading edge 25, 35, and extends downwardly. The motor 60 is pivotally connected to the hinge plate 28 at the hinge point 33. The propeller 70 and pylon structure is fixed to the control surface 50, which rotates about the hinge point 33.

In the second embodiment, having wing underside mounted motors 60, the sequence of wing adjustments depicted in FIGS. 11A to 11D shows the change of inclination of the motors 60 and control surfaces 50 when transitioning between the vertical take-off wing position and the horizontal forward flight wing position. In the same manner as the first embodiment, the leading edges 25, 35 are stationary, and non-pivoting, and the motors 60 and control surfaces 50 pivot in unison.

Figure 12:
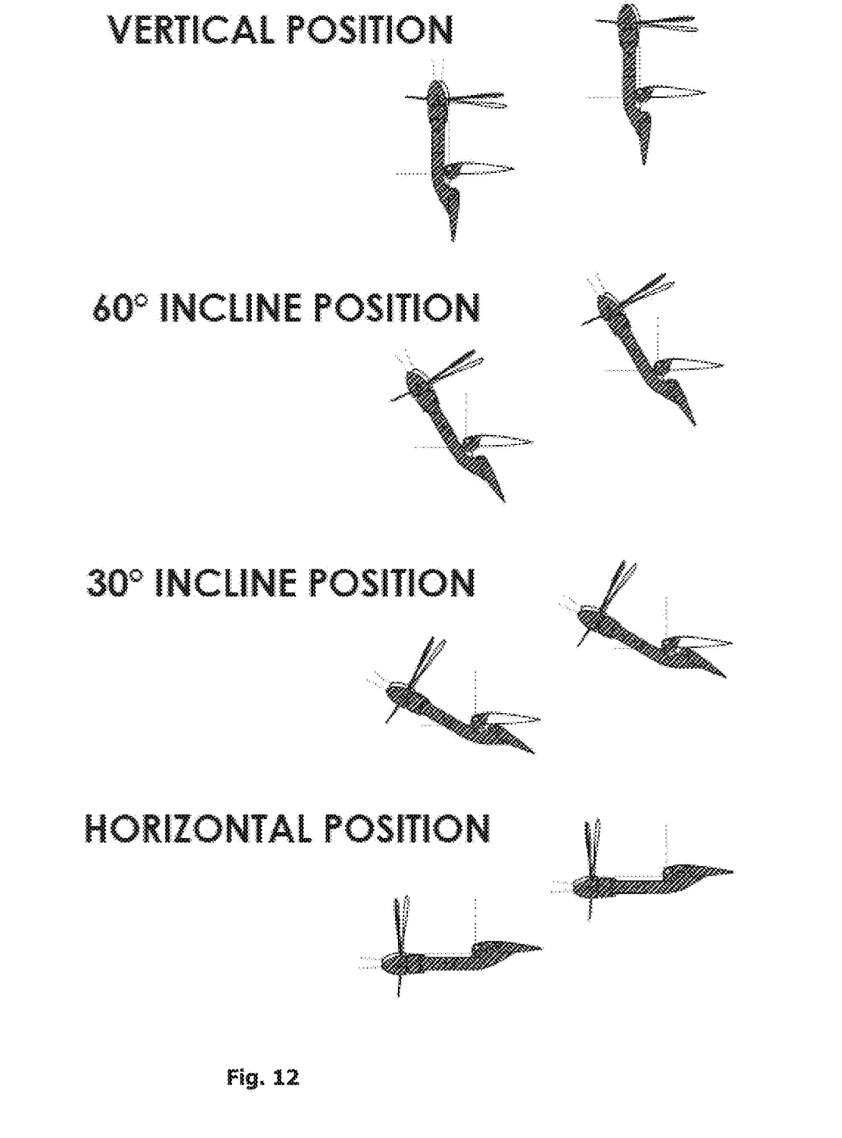
FIG. 12 is a schematic cross-sectional view depicting the transition between vertical and horizontal for the wing arrangement of the aircraft of any one of FIGS. 7 to 11D.

FIG. 12 is a schematic cross-sectional view depicting the transition between vertical and horizontal for the wing arrangement of any one of FIGS. 7 to 11D. As shown in that figure, the vertical and horizontal spacing between the forward and rearward wings is shown. FIG. 12 also depicts that the thrust lines of the adjacent motors on each wing being non-parallel, which results in the moment about the hinge point 33, which can be selectively used to rotate to control surfaces 50.

In the embodiments depicted in FIGS. 1 to 17, there are either two or four motors 60 mounted to each wing 20, 22, 30, 32. However, additional motors 60 may be mounted to the aircraft 10, for example on the wings 20, 22, 30, 32, the nose of the fuselage 24 or the wing connecting members 42.

Figure 15:
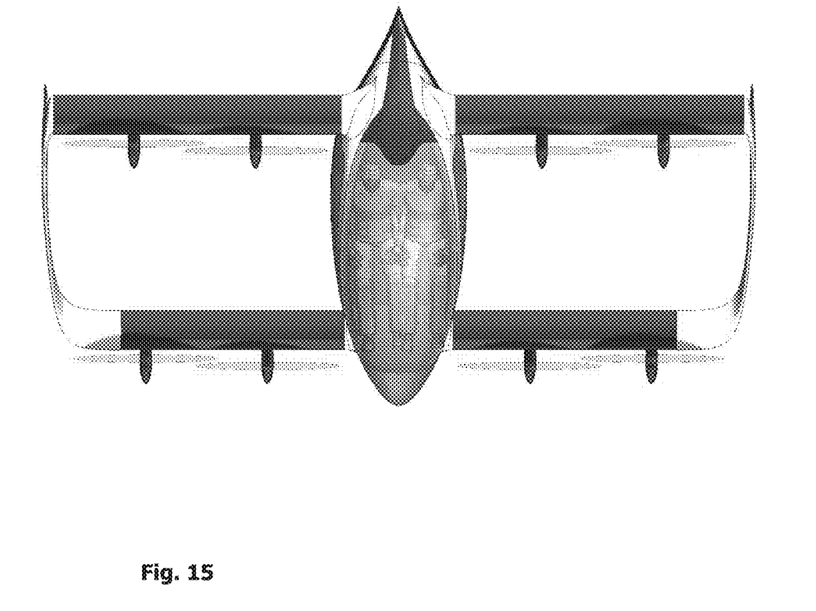
FIG. 15 is a top view of the aircraft with the rotors depicted in a horizontal axis position.
Figure 16:
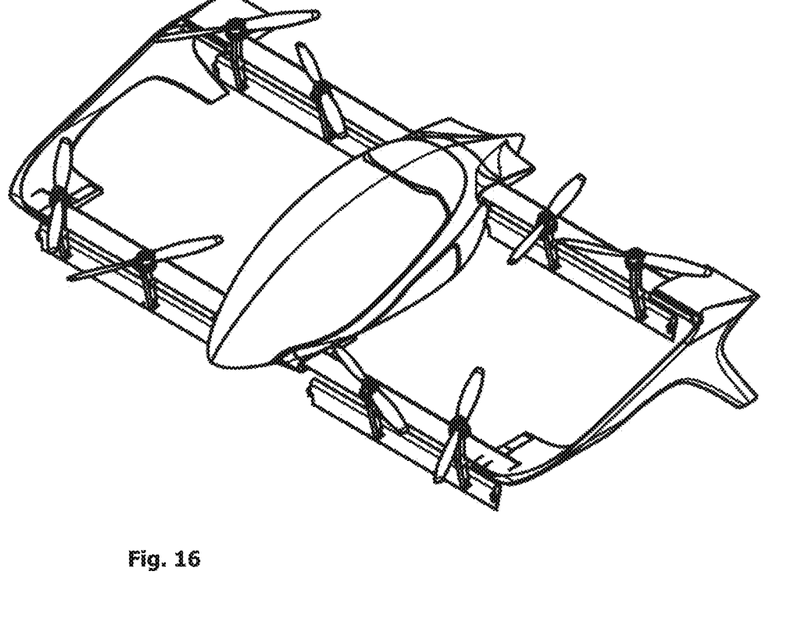
FIG. 16 is a perspective view of the aircraft with the rotors depicted in a vertical axis position.
Figure 17:
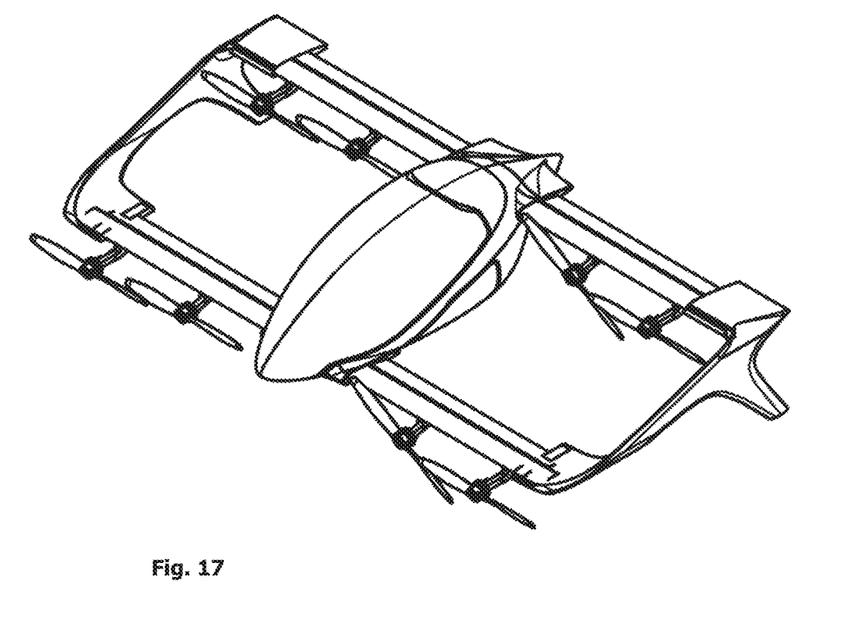
FIG. 17 is front view of the aircraft with the rotors depicted in a horizontal axis position.
Figure 18:
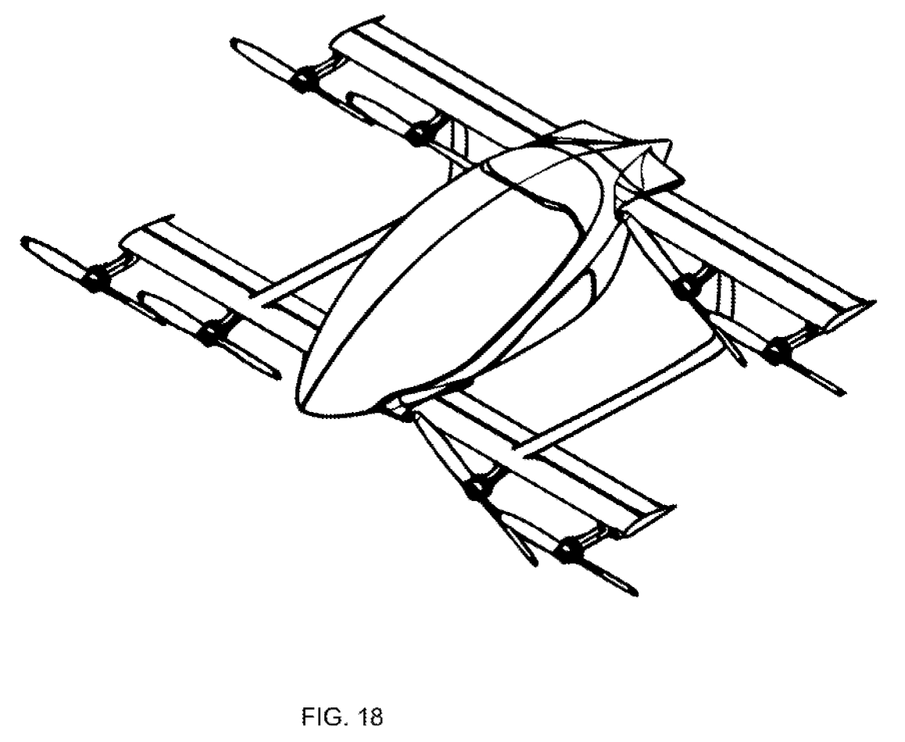
FIG. 18 is a perspective view of the aircraft with the forward wing connected to the adjacent rearward wing with struts or tie bars.

In the embodiment depicted in FIGS. 15 to 17, there are two motors 60 mounted to each wing 20, 22, 30, 32. By employing lower numbers of motors 60, the rotor 70 diameter can be increased. As shown in the embodiment of FIG. 17, the rotor blade 70 diameters overlap with adjacent rotor blades when viewed from the front. In order to accommodate the overlap, the motors 60 are mounted such that each set of rotor blades is longitudinally offset relative to the adjacent set of rotor blades (relative to an axis of rotation), thereby preventing contact between the adjacent rotors, whilst permitting large diameter rotors to be deployed. This is shown in FIG. 15.

In one embodiment, the hinge mechanism can be integrated into the motor pod structure further reducing structural weight. A further possible improvement is that when there are multiple motor pods, each pod houses a hinge bearing.

Figure 10:
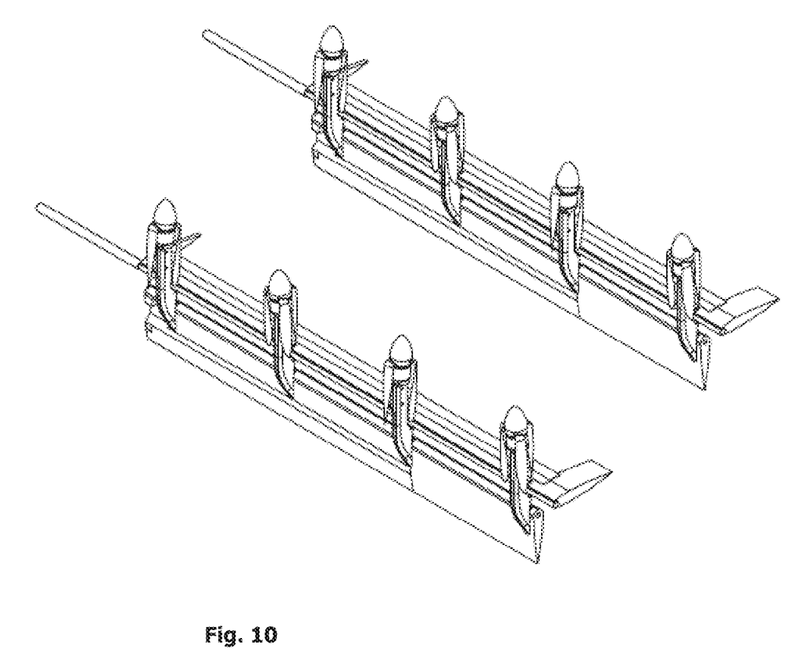
FIG. 10 is a perspective view of the wing arrangement of FIG. 7, with the rotor blades towed.
Figure 11A:
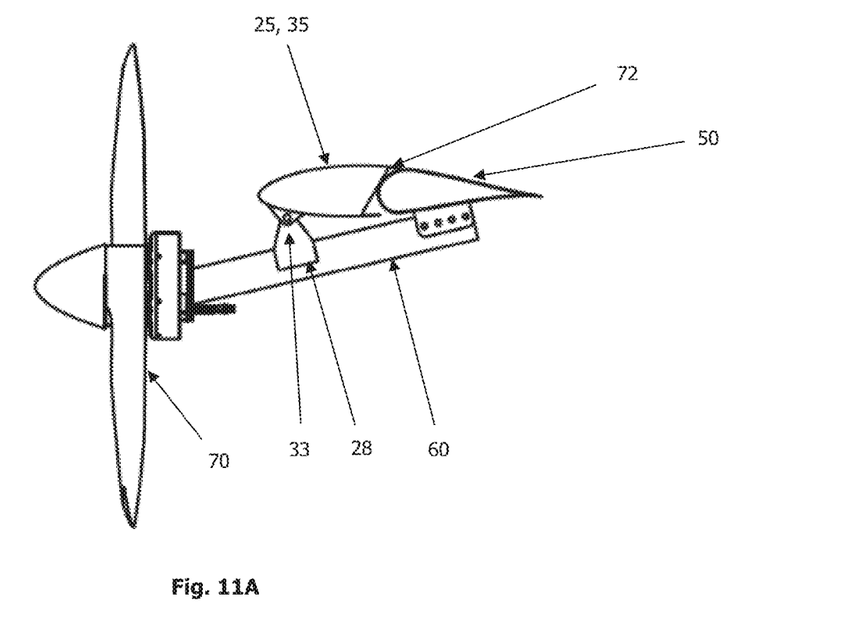
FIG. 11A is a schematic side view showing a mounting arrangement for mounting an electric motor to a wing of the aircraft (vertical rotor axis)
Figure 11B:
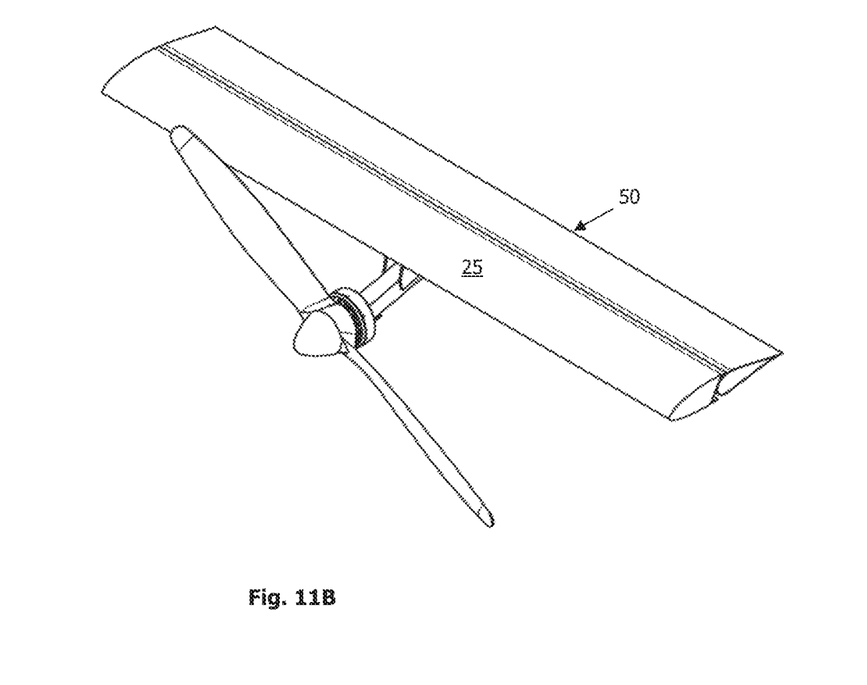
FIG. 11B is a perspective view of the mounting arrangement of FIG. 11A.
Figure 11C:
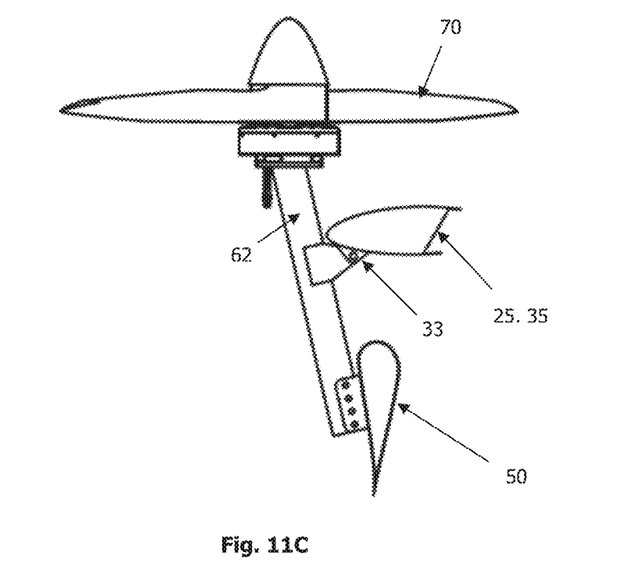
FIG. 11C is a schematic side view showing the mounting arrangement of FIG. 11A, but with the rotor axis being vertical.
Figure 11D:
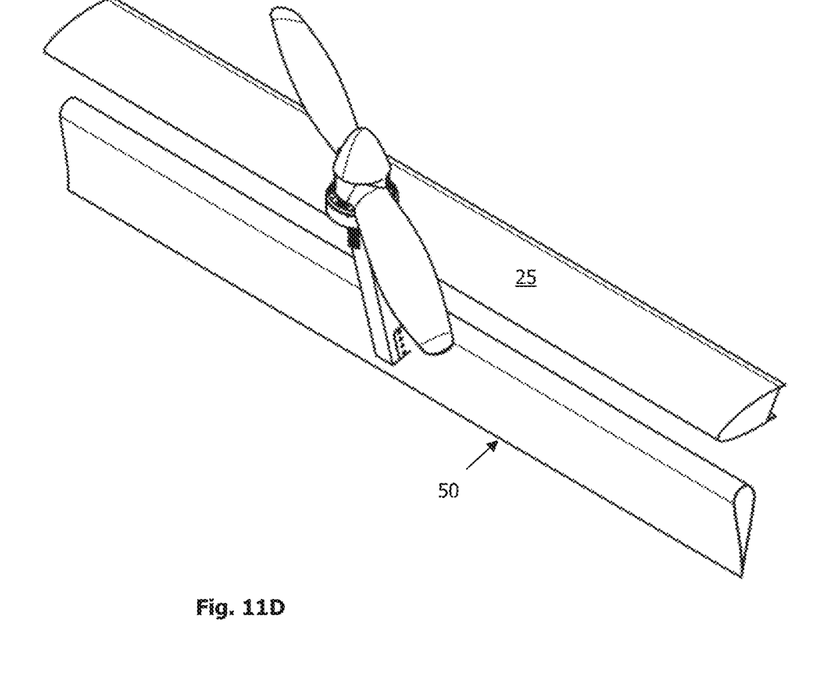
FIG. 11D is a perspective view of the mounting arrangement of FIG. 11C.

Referring to FIG. 10, the rotor 70 blades of the motors 60 may fold downwardly when not in use. Furthermore, some of the rotor blades 60 may fold downwardly and rearwardly when in forward flight mode, as less propulsion power is normally required in forward flight mode as compared to take-off and landing.

Advantageously, the aircraft 10 permits smaller distributed hinge bearings for each motor 60, which can be redundant, and of a much small diameter (therefore lighter).

The invention can provide a slotted leading edge that dramatically reduces buffet experienced by tilt wing aircraft during descent.

Additional electric motors (not shown) may be mounted to structures other than the wings, such as the fuselage, in order to generate additional lift force and/or forward speed.

Advantageously, a box wing structure is more aerodynamically efficient than a conventional wing of the same size and can be more structurally efficient (therefore lighter).

Advantageously, the boxed wing structure provides additional rigidity.

Advantageously, the aircraft 10 reduces the weight of the bearings and tilt structure required when compared to a conventional tilt wing aircraft. This is because a conventional tilt wing requires a single large bearing pair (one on either side of the aircraft fuselage) with stiff structure that rotates.

Although the invention has been described with reference to specific examples, it will be appreciated by those skilled in the art that the invention may be embodied in many other forms.

The invention claimed is:

1. A vertical take-off and landing (VTOL) aircraft comprising:
    a fuselage;
    first and second forward wings mounted to opposing sides of the fuselage;
    first and second rearward wings mounted to opposing sides of the fuselage;
    each wing having a fixed leading edge and a trailing control surface which is pivotal about a generally horizontal axis;
    a plurality of electric rotors mounted to the wings, the electric rotors being pivotal with the trailing control surface between a first position in which each rotor has a generally vertical axis of rotation, and a second position in which each rotor has a generally horizontal axis of rotation;
    wherein at least one of the first forward wing, second forward wing, first rearward wing and second rearward wing has a first and a second electric rotor of the plurality of electric rotors which are each pivotal with a common trailing control surface, wherein a body portion of each of the first and second electric rotors is secured to the common trailing control surface, and the first and a second electric rotor are mounted having non-parallel axes of rotation so that a first thrust line of the first electric rotor is positioned to rotate the common trailing control surface in a first direction about a hinge line a second thrust line of the second electric rotor is positioned to rotate the common trailing control surface in a second direction about the hinge line the second direction being opposite the first direction.

2. The vertical take-off and landing (VTOL) aircraft of claim 1, wherein a thrust line of the first electric rotor is angled to pass above a hinge line, and a thrust line of the second electric rotor is angled to pass below the hinge line.

3. The vertical take-off and landing (VTOL) aircraft of claim 1, wherein an axis of rotation of the first electric rotor is angled upwardly relative to a plane passing through leading and trailing portions of the common trailing control surface, and an axis of rotation of the second electric rotor is angled downwardly relative to a plane passing through leading and trailing portions of the common trailing control surface.

4. The vertical take-off and landing (VTOL) aircraft of claim 1, wherein when first and second electric motors are operated at the same rotational speeds, turning moments generated by each of the first and second motors and acting on the common trailing control surface cancel each other out.

5. The vertical take-off and landing (VTOL) aircraft of claim 1, wherein first and second electric motors are pivotally mounted to an underside of the fixed leading edge.

6. The vertical take-off and landing (VTOL) aircraft of claim 5, wherein a distal end of each of the first and a second electric rotors is secured to the trailing control surface.

7. A vertical take-off and landing (VTOL) aircraft comprising:
    a fuselage;
    first and second forward wings mounted to opposing sides of the fuselage;
    first and second rearward wings mounted to opposing sides of the fuselage;
    each wing having a fixed leading edge and a trailing control surface which is pivotal about a generally horizontal axis;
    a plurality of electric motors each having rotors mounted to the wings, the electric rotors being pivotal with the trailing control surface between a first position in which each rotor has a generally vertical axis of rotation, and a second position in which each rotor has a generally horizontal axis of rotation;
    wherein at least one of the first forward wing, second forward wing, first rearward wing and second rearward wing has a first and a second electric rotor of the plurality of electric rotors which are offset relative to upper and lower surfaces of the wing, and pivotal with a common trailing control surface, and
    wherein a body portion of each of the first and second electric rotors is secured to the common trailing control surface so that a first thrust line of the first electric rotor is positioned to rotate the common trailing control surface in a first direction about a hinge line a second thrust line of the second electric rotor is positioned to rotate the common trailing control surface in a second direction about the hinge line the second direction being opposite the first direction.

8. The vertical take-off and landing (VTOL) aircraft of claim 7, wherein the first electric rotor is located below the lower surface of thewings, and the second electric rotor is located above the upper surface of the wings.

9. The vertical take-off and landing (VTOL) aircraft of claim 7, wherein the electric rotors are distributed along the wings at positions below the lower surface of the wings and alternately above the upper surface of the wings.

10. The vertical take-off and landing (VTOL) aircraft of claim 1, where a distal portion of each forward wing, furthest from the fuselage, is connected to a distal portion of the adjacent rearward wing with a connecting member, defining a boxed wing structure.

11. The vertical take-off and landing (VTOL) aircraft of claim 1, where each forward wing is connected to the adjacent rearward wing with one or more struts or tie bars.

12. The vertical take-off and landing (VTOL) aircraft of claim 1, wherein the common trailing control surface is pivotal through a range of about 80 and 100 degrees.

13. The vertical take-off and landing (VTOL) aircraft of claim 12, wherein the common trailing control surface is pivotal through a range of about 90 degrees.

14. A vertical take-off and landing (VTOL) aircraft comprising:
    a fuselage;
    first and second forward wings mounted to opposing sides of the fuselage;
    first and second rearward wings mounted to opposing sides of the fuselage, each forward wing being connected to the adjacent rearward wing with a distal connecting member or strut(s) to define a box wing or strut braced wing structure;

each wing having a fixed leading edge and a trailing control surface which is pivotal about a generally horizontal axis; and first and second electric rotors mounted to one of the first forward wing, second forward wing, first rearward wing and second rearward wing, the electric rotors being pivotal with a common trailing control surface between a first position in which each rotor has a generally vertical axis of rotation, and a second position in which each rotor has a generally horizontal axis of rotation, wherein a body portion of each of the first and second electric rotors is secured to the common trailing control surface so that a first thrust line of the first electric rotor is positioned to rotate the common trailing control surface in a first direction about a hinge line a second thrust line of the second electric rotor is positioned to rotate the common trailing control surface in a second direction about the hinge line the second direction being opposite the first direction.

15. The vertical take-off and landing (VTOL) aircraft of claim 14, wherein at least one of the wings has a first and a second electric rotor which are offset relative to an upper and a lower surface of the wings.

16. The vertical take-off and landing (VTOL) aircraft of claim 14, wherein the electric rotors are distributed along the wings at positions below the lower surface of the wings and alternately above the upper surface of the wings.

17. The vertical take-off and landing (VTOL) aircraft of claim 1, wherein each rotor is longitudinally offset relative to an adjacent rotor mounted on the same wing, about an axis of rotation of the rotors.

18. The vertical take-off and landing (VTOL) aircraft of claim 17, wherein each rotor outer diameter is overlapping relative to an adjacent rotor outer diameter and mounted on the same wing, when viewed in a plane extending perpendicular to an axis of rotation of the rotors.

19. The vertical take-off and landing (VTOL) aircraft of claims claim 1, wherein the fuselage has a cabin which is accessed through a door which is forward facing and hinged at an upper region to open upwardly.

20. The vertical take-off and landing (VTOL) aircraft of claim 1, wherein the first and second rearward wings each includes a downwardly and rearwardly extending winglet having one or more wheels for supporting the aircraft.

* * * * *